July 11, 1950 W. A. ELLIS 2,514,697

SPOOL FOR HOLDING FISHLINE LEADERS

Filed Jan. 26, 1948

INVENTOR.
William A. Ellis
BY
Mann, Liddy, Slocum & Rich
Attys.

Patented July 11, 1950

2,514,697

UNITED STATES PATENT OFFICE 2,514,697

SPOOL FOR HOLDING FISHLINE LEADERS

William A. Ellis, Portland, Oreg.

Application January 26, 1948, Serial No. 4,328

4 Claims. (Cl. 242—96)

My present invention has for its object to provide a spool for winding cord or wire-like material especially such as may possess an inherent springiness giving it a tendency to unwind when a length which has been coiled is released. The foregoing statement applies equally to fish line leaders and while the spool I have devised is particularly devised for retaining leaders it may readily be adapted for other and wider uses in commerce.

More specifically my invention has for its object to provide a spool having one or more encircling grooves and transverse resilient members spaced about its periphery and forming gateways which will permit a leader as it is wound on the spool to pass into a groove, said members then resisting the tendency of the leader to unwind of its own accord yet permitting it to be disengaged from the spool with comparative ease.

To these and other ends my invention comprises further improvements and advantages as will be further described in the accompanying specification, the novel features thereof being set forth in the appended claims.

In the drawings.

Similar reference numerals, in the several figures, indicate similar parts.

A spool constructed in accordance with my invention comprises a body 10 preferably oval in shape and of a size to be readily rotated or spun while held in the fingers of one hand to facilitate which its ends are provided with shallow circular depressions 11—11 forming convenient finger grips. The body should be buoyant so that it may be recovered if accidentally dropped overboard in deep water. To this end I form the body of two similar hollow halves of molded material, for example a similar plastic hermetically sealed along a central parting line.

Figure 1:
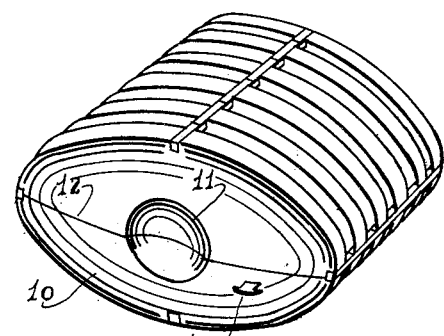
Figure 1 is a perspective view of a spool embodying my invention.
Figure 3:
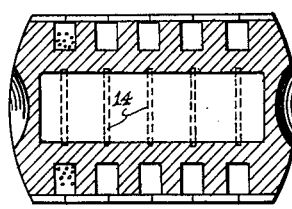
Figure 3 is a horizontal sectional view taken on the line 3—3 of Fig. 2.
Figure 4:
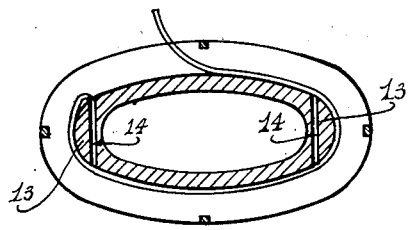
Figure 4 is a vertical sectional view taken on the line 4—4 of Fig. 2.
Figure 2:
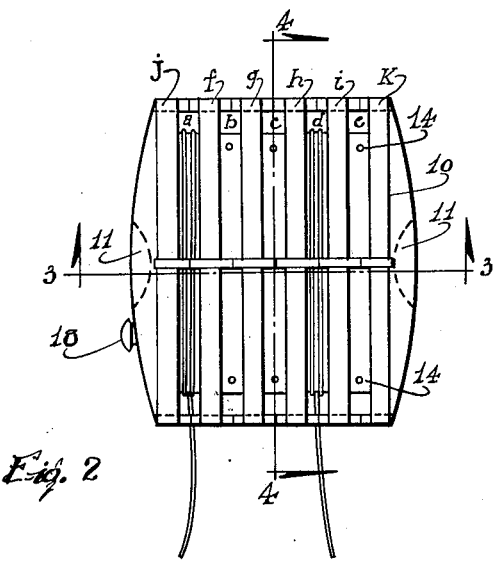
Figure 2 is an elevational view thereof.
Figure 5:
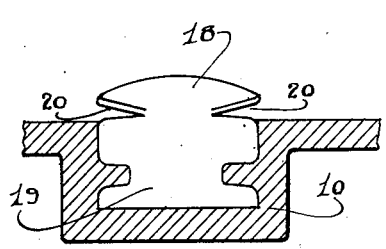
Figure 5 is an enlarged fragmentary view illustrating a cutter.

Extending around the elliptical contour of the spool are a series of annular grooves $a$, $b$, $c$, $d$, and $e$ preferably of equal width and spacing so as to leave between them ribs $f$, $g$, $h$ and $i$ of equal width, the symmetry of the spool being maintained by arranging the grooves and ribs so that the spool ends $j$ and $h$ will be flanges of like width. The spool being elliptical and hollow I form it with thickened portions 13 at the ends of its major axis, as shown in Fig. 4, and at points beyond the foci I locate bore holes 14 which pass completely through the spool at the bottoms of the several grooves. These holes are of a suitable diameter to receive the end of a leader to secure its inner end at the commencement of a winding operation. Since the holes extend entirely through the spool and are at each end of each groove it will be seen that it is immaterial how the spool may be held preliminary to the winding operation or in which direction the winding may be laid in any particular groove.

Figure 6:
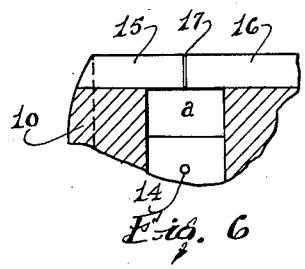
Figure 6 is an enlarged fragmentary view showing a pair of cooperating retaining members in their relation to a winding groove.

A plurality of channels, preferably four in number, extend transversely across the face of the spool, there being one at each end of the major and minor axes and of a depth somewhat less than that of the grooves, which are provided for the purpose of holding the leader retaining members. Each of the latter with respect to its individual portion of any groove comprises separate members 15 and 16, as shown in Fig. 6, arranged end to end and formed of suitable resilient material capable of yielding readily to permit the free ingress of a leader as it is drawn into a groove by the winding operation. These members are preferably rectangular in cross section so that notwithstanding their flexibility they normally resist any normal tendency for a leader to unwind yet readily permit its egress when it is withdrawn from a groove manually. A convenient way which I employ in practice of forming the various retaining members 15—16 is to insert a bar of flexible plastic or rubber in each of the aforementioned transverse channels and subsequently severing it, as indicated at 17 in Fig. 6, midway of the underlying groove.

It is desirable in a device of this nature to provide a cutter and such element I mount on one end of the spool, as indicated by 18. It comprises a plate having a body portion 19, embedded for permanent retraction in the material from which the spool is molded, having at each side inwardly extending V-shaped recesses 20 one edge of each of which is sharpened to a knife edge.

While I have mentioned particularly the form of the spool embodying my invention in connection with its convenient handling and storing leaders for fishing lines it will of course be understood that its construction may readily be adapted as a holder for cords and wire of a nature which imparts to them a tendency to unwind when they are wrapped into coils.

I claim:

1. A fish line leader spool comprising a body of oval form having an annular peripheral groove and provided with bore holes in the bottom of the groove for the reception of a free end of a leader, said body having shallow transverse channels at the ends of the major and minor axes of the body and flexible retaining members fixed in said channels in end to end engagement within the groove.

2. A fish line leader spool comprising a hollow buoyant elliptical shaped body having an annular peripheral groove and provided with shallow transverse channels at its ends and sides and flexible retaining fingers fixed in the channels in opposing positions and serving to permit the free ingress and egress of a leader with respect to said groove, as the spool is revolved.

3. A fish line leader spool having a plurality of spaced peripheral grooves and provided with a number of channels spaced around the spool and extending transversely of the several grooves, flexible retaining strips secured in said channels, said strips being severed midway of each groove to permit the passage of leaders into successive portions of the grooves as they are wound on the spool.

4. A fish line spool comprising a hollow buoyant elliptical shaped body having a plurality of spaced peripheral grooves and provided with a number of channels spaced around the body and extending transversely of the several grooves, said body having transverse bore holes at the bottoms of the grooves for the retention of the free end of a leader, flexible strips secured in said channels, said strips being severed midway of each groove to permit the passage of a leader into and out of a groove and serving to retain it therein while wound on the spool.

WILLIAM A. ELLIS.

REFERENCES CITED

The following references are of record in the file of this patent:

UNITED STATES PATENTS

| Number | Name | Date |
|---|---|---|
| 2,364,262 | Wehringer | Dec. 5, 1944 |